Patented Apr. 10, 1945

2,373,173

UNITED STATES PATENT OFFICE 2,373,173

RUBBER PLASTICIZERS

Russell T. Dean, Stamford, Conn., assignor to American Cyanamid Company, New York, N. Y., a corporation of Maine No Drawing. Application July 24, 1942, Serial No. 452,203

10 Claims. (Cl. 260—761)

This invention relates to the treatment of rubber and, more particularly, to the production of rubber compositions of increased plasticity.

It is well known that when rubber is subjected to mechanical working in the presence of oxygen it is rendered more plastic. However, it is frequently desirable to accelerate this plasticization and thus shorten the time of milling.

It is an object of the present invention to provide a process for increasing the rate of breakdown of unvulcanized rubber and for making it more plastic. It is a further object of this invention to provide an unvulcanized rubber of increased plasticity. It is an additional object to provide a new class of rubber plasticizing agents.

The foregoing and other objects may be attained by subjecting unvulcanized rubber to the action of a small amount of a salt of a pseudo-urea by milling or similarly mixing unvulcanized rubber therewith for a short time at an elevated temperature. These salts may be represented by the following general formula:

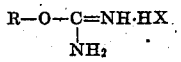

in which R is an alkyl or an aralkyl radical and HX is a salt-forming acid. The alkyl radical may be saturated or unsaturated, straight-chain, branched, or cyclic, and may be substituted by such groups as hydroxyl, alkoxy, nitro, halogen, or the like. The aralkyl radicals may also carry similar substituent groups.

As illustrative, the salts of the substituted pseudo-ureas may be prepared by the reaction of cyanamide, cyanamide dihydrochloride and an appropriate alcohol. The procedure which may be followed is typified by Example 1, of U. S. Patent No. 2,156,193. By further reacting this condensation product in a suitable solvent with a sodium salt of a desired fatty acid, other salts of the pseudo-urea may be formed.

The most desirable point for the addition of the plasticizing agent is just after preliminary milling of the rubber and preferably in the absence of compounding ingredients, especially sulfur.

In general, the amount of plasticizing agent to be added will not be much above 1% of the weight of the rubber; for example, about 0.375%. Larger amounts may be used if desired but this is generally uneconomical since a proportionate increase in the plasticizing effect is not obtained. The plasticizing agent may be used singly or in admixture with one or more other similar agents, as will be apparent to one skilled in the art.

The plasticizing agents will be more effective at elevated temperatures, e. g., above about 50° C. Any temperature at which rubber may be heated without detrimental effect may be used, e. g., up to about 150° C.

The invention is further illustrated by the following specific examples to which, however, it is not to be limited. Unless otherwise stated, parts are given by weight. The softening effect of the compounds on the rubber in these examples was determined in accordance with a modification of the well-known Zimmerman and Cooper method (Industrial and Engineering Chemistry, 20, p. 812, 1928). The plasticity measurements were made in a Williams plastometer at 100° C. using a 3-minute "Y" value. The decrease in "Y" value indicates the higher plasticity or softening of the rubber obtained by using the plasticizers set forth.

Example

Four hundred and twenty parts of smoked sheet rubber were placed on 12-inch rolls, the initial temperature of the rolls being 95° C. After milling for five minutes, 20 parts of rubber (A) were removed for purposes of the test and to the remaining 400 parts of rubber on the mill were added 1.5 parts (0.375%) of the plasticizer compound. Milling of this rubber mix was continued for an additional five minutes to give the finished batch (B). The following tabulation indicates the increase of plasticity on the basis of "Y" values for the several plasticizers indicated.

| Compound | "Y" values | |
|---|---|---|
|  | A | B |
| Control (no plasticizer) | 0.165 | 0.155 |
| Cyclohexyl pseudo-urea stearate | 0.166 | 0.145 |
| 2-ethyl hexyl pseudo-urea stearate | 0.174 | 0.147 |
| Isoamyl pseudo-urea stearate | 0.173 | 0.153 |
| n-Octyl pseudo-urea stearate | 0.165 | 0.146 |
| Lauryl pseudo-urea stearate | 0.180 | 0.146 |

Compounding and vulcanization of the plasticized rubber may be carried out in a manner known to those skilled in the art. Because of the reduction in time of mechanical working obtained in accordance with this invention, the rubber treated thereby, in general, will give vulcanized stocks with better physical properties. Mixtures of the plasticized rubber may be made with compatible synthetic rubber-like materials if desired.

My compounds may be utilized in rubber cements by dissolving in a solvent, unvulcanized rubber which has been plasticized with a softening agent of the present invention.

The activity of the compounds as plasticizers appears to be influenced by the substituent attached to the oxygen atom of the pseudo-urea nucleus. The preferred compounds are generally the higher fatty acid salts of the pseudo-ureas. The pseudo- or isourea nucleus may be that of any of the following: n-butyl isourea, sec. butyl isourea, isobutyl isourea, amyl isourea, decyl isourea, dodecyl isourea, benzyl isourea, cyclohexyl isourea, octadecyl isourea, hexadecyl isourea, n-octyl isourea. The acids used in the salts are usually the higher fatty acids but plasticizing compounds may be obtained utilizing salts of any of the following acids: acetic, propionic, n-butyric, isobutyric, 2-ethyl butyric, 2-ethyl hexoic, lauric, palmitic, stearic, phenyl acetic, p-toluene sulfonic, p-toluene sulfinic, benzoic, phthalic, succinic, naphthoic, sulfonic, phenyl benzoic, naphthyl benzoic, and halogen substituted acids such as the chloracetic acids.

Suitable variations and changes in the invention may be made without departing from the spirit thereof or the scope of the following claims, which are to be construed as broadly as is permissible in view of the prior art.

I claim:

1. A process of increasing the plasticity of rubber which comprises milling unvulcanized rubber in the presence of a small amount of a salt of a pseudo-urea, said salt being represented by the following general formula:

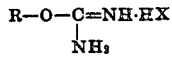

in which R is a member of the class consisting of the cyclohexyl, benzyl and the alkyl radicals having from about 4 to 18 carbon atoms and HX is a higher fatty acid, for a time sufficient to effect an increase in the plasticity of the rubber over that which it would have if subjected to the same conditions in the absence of said salt.

2. A process of increasing the plasticity of rubber which comprises milling unvulcanized rubber in the presence of a small amount of a salt of a pseudo-urea, said salt being represented by the following general formula:

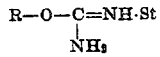

in which R is a member of the class consisting of the cyclohexyl, benzyl and the alkyl radicals having from about 4 to 18 carbon atoms, and St represents stearic acid, for a time sufficient to effect an increase in the plasticity of the rubber over that which it would have if subjected to the same conditions in the absence of said salt.

3. A process of increasing the plasticity of rubber which comprises milling unvulcanized rubber in the presence of a small amount of 2-ethyl hexyl pseudo-urea stearate for a time sufficient to effect an increase in the plasticity of the rubber over that which it would have if subjected to the same conditions in the absence of said salt.

4. A process of increasing the plasticity of rubber which comprises milling unvulcanized rubber in the presence of a small amount of cyclohexyl pseudo-urea stearate for a time sufficient to effect an increase in the plasticity of the rubber over that which it would have if subjected to the same conditions in the absence of said salt.

5. A process of increasing the plasticity of rubber which comprises milling unvulcanized rubber in the presence of a small amount of lauryl pseudo-urea stearate for a time sufficient to effect an increase in the plasticity of the rubber over that which it would have if subjected to the same conditions in the absence of said salt.

6. Unvulcanized rubber of increased plasticity comprising rubber having uniformly dispersed therein a small amount of pseudo-urea salt represented by the following general formula:

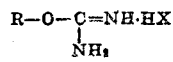

in which R is a member of the class consisting of the cyclohexyl, benzyl and the alkyl radicals having from about 4 to 18 carbon atoms and HX is a higher fatty acid.

7. Unvulcanized rubber of increased plasticity comprising rubber having uniformly dispersed therein a small amount of a pseudo-urea salt represented by the following general formula:

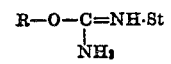

in which R is a member of the class consisting of the cyclohexyl, benzyl and the alkyl radicals having from about 4 to 18 carbon atoms and St represents stearic acid.

8. Unvulcanized rubber of increased plasticity comprising rubber milled with a small amount of 2-ethyl hexyl pseudo-urea stearate.

9. Unvulcanized rubber of increased plasticity comprising rubber milled with small amount of cyclohexyl pseudo-urea stearate.

10. Unvulcanized rubber of increased plasticity comprising rubber milled with a small amount of lauryl pseudo-urea stearate.

RUSSELL T. DEAN.